April 5, 1966 M. H. LEWIN 3,245,052

CONTENT ADDRESSED MEMORY

Filed May 17, 1962 3 Sheets-Sheet 1

INVENTOR.
MORTON H. LEWIN
BY
[signature]
Attorney

LEGEND
(A) = AND GATE
+++ = MULTIPLE CONDUCTORS

INVENTOR.
MORTON H. LEWIN
BY [signature]
Attorney

INVENTOR.
MORTON H. LEWIN
BY
Attorney

United States Patent Office
3,245,052
Patented Apr. 5, 1966

3,245,052
CONTENT ADDRESSED MEMORY

Morton H. Lewin, Princeton, N.J., assignor to Radio Corporation of America, a corporation of Delaware Filed May 17, 1962, Ser. No. 196,045
7 Claims. (Cl. 340—173)

This invention is related to one described in copending application Serial No. 183,187, titled "Memory," filed March 28, 1962, by the present inventor. The copending application deals with the problem of retrieving from a "content-addressed" (also known as an "associative" or "catalog") memory more than one item of information (more than one word) associated with a given "tag word." The present invention is concerned with increasing the capacity of the memory without substantially increasing the time required to retrieve the words from the memory.

In the memory of the invention, information is stored in a plurality of memory modules. There is one power supply which is adequate for one of the modules and one set of driver, sensing and other circuits, also adequate for only one of the modules. The power supply is connected to one of the modules through a switching matrix and all other modules are disconnected from the power supply by the same matrix. A second matrix essentially isolates the set of driver, sensing and other circuits from all except the one module. The one module is interrogated in accordance with the interrogation routine discussed in the copending application in order to etxract all words in that module corresponding to the tag word. When all such words have been sensed, a signal produced by the set of circuits causes the switching matrix to disconnect the power supply from the one module and to connect it to a second module. The process continues until all modules in the memory have been interrogated.

The invention is discussed in greater detail below and is illustrated in the following drawing, of which:

Throughout the figures similar reference numerals are applied to similar elements.

Figure 1:
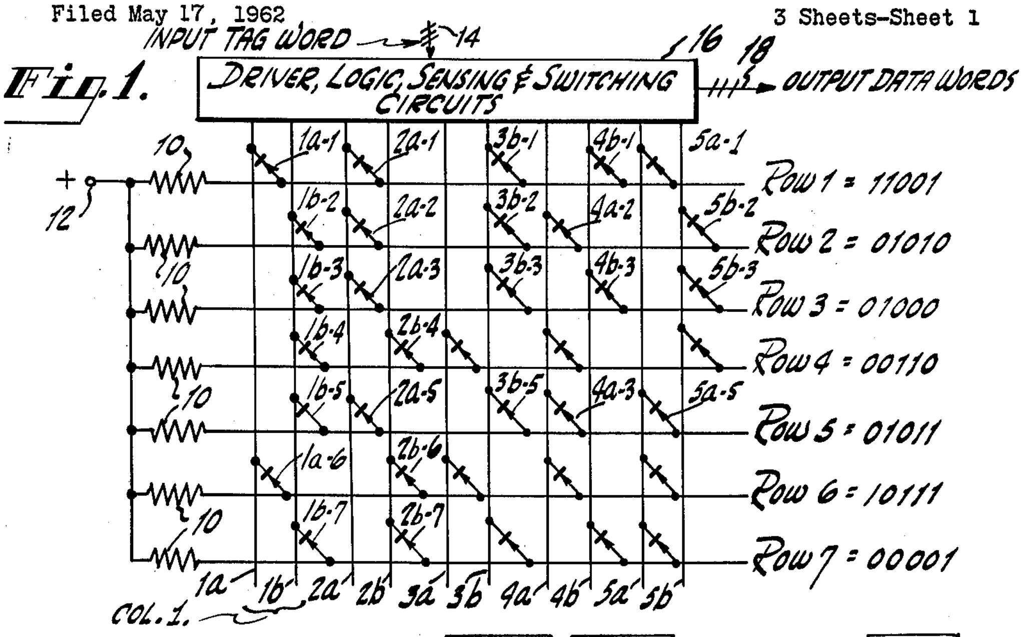
FIG. 1 is a block and schematic circuit diagram of a content-addressed memory such as described in the copending application above.
Figure 2:
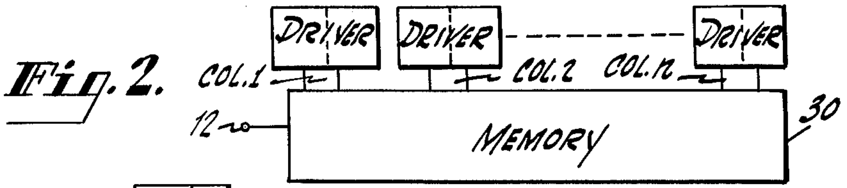
FIG. 2 is a block diagram of a portion of interest of the memory of FIG. 1.

FIG. 1 corresponds to FIG. 2 of the copending application above. The content-addressed memory shown has seven rows and five columns. In practice, the memory may be much larger than this but the smaller size memory is employed for purposes of illustration. Each column in the memory has two leads *a* and *b* and each row has one lead. At each place in the memory where a column intersects a row, a diode is connected either from the *a* column to the row lead (to represent storage of a binary "one") or the *b* column to the row lead (to represent storage of a binary "zero") but not from both the *a* and *b* columns to the row lead. The diodes are identified by the legend $\alpha$–$\beta$ where $\alpha$ refers to the column and $\beta$ refers to the row. For example, there is a diode connected between column 1*a* and row 1 and this diode is legended 1*a*–1. In this example, the anode is always connected to the row lead, however, with different polarity power supply connections, the diodes would be connected in the opposite sense.

All of the row leads in the memory are connected through resistors 10 to a common terminal 12 to which a positive voltage is applied. The input tag word is applied through a bus 14 to a block 16 legended driver, logic, sensing and switching circuits. These circuits are discussed in more detail in the copending application. Their function is to apply the tag word to the memory and to extract from the memory the one or more output data words therein corresponding to the tag word. The output data word or words appear on bus 18.

The operation of the memory of FIG. 2 will be discussed by two examples. In the first, the tag word has two bits and these are applied to columns 1 and 2. The two bits are 1, 1. The "one" applied to column 1 causes diodes 1*b*–2, 1*b*–3, 1*b*–4, 1*b*–5 and 1*b*–7 to conduct since column lead 1*b* is made negative. Diodes 1*a*–1 and 1*a*–6 are cut-off since column lead 1*a* is made positive. The "one" applied to column 2 causes diodes 2*b*–4, 2*b*–6 and 2*b*–7 to conduct and diodes 2*a*–1, 2*a*–2, 2*a*–3 and 2*a*–5 to be cut-off.

As diodes 1*a*–1 and 2*a*–1 are cut off, the row 1 lead carries a positive voltage. Rows 2–7 are returned through conducting diodes 1*b*–2, 1*b*–3, 1*b*–4 and 2*b*–4, 1*b*–5, 2*b*–6, and 1*b*–7 and 2*b*–7, respectively, to a negative voltage source. Rows 2–7 therefore all carry a negative voltage. Both wires of columns 3, 4 and 5 are all returned through an appropriate impedance in block 16 to a source having a neagtive value of voltage, however, not quite so negative as the voltage appearing on rows 2–7. Accordingly, the only diodes connected to columns 3, 4 and 5 which conduct are those in row 1, namely diodes 3*b*–1, 4*b*–1 and 5*a*–1. Positive voltages are developed on column wires 3*b*, 4*b* and 5*a*. The sensing circuits in block 16 sense the positive voltages in columns 3, 4 and 5 and sense also the positive voltages in the columns 1 and 2 to which the tag word is applied. The word sensed is therefore 11001 and this is the output data word from the memory. This example is a simple one since there is only one word in the memory corresponding to the tag.

In the next example, assume again that the input tag word is two bits and is applied to columns 1 and 2. The value of the tag word, however, is 0, 1. By an analysis similar to the one given above, it can be shown that there are three words in the memory corresponding to the tag word, namely the words in rows 2, 3 and 5. If it is attempted to sense the memory during the time that the tag word is applied, 0, 1 is sensed in column 3 and 1,1 is sensed in columns 4 and 5. Any 1,1 indicates that there is more than one word in the memory corresponding to the tag. In the present example, there are three different words.

The way in which the three words in the memory corresponding to the tag are extracted from the memory is discussed in detail in the copending application. The time required is shown to be related only to the number of words to be retrieved from the memory and is not dependent either on the memory size or the number of bits in each word. If there are N words in the memory corresponding to the tag word, the time required to extract the N words is proportional to $2N-1$.

In FIG. 2, the memory of FIG. 1 is illustrated by a single block 30. There are $n$ columns in this memory. In the memory of FIG. 1, $n$ is given as 5. However, as mentioned previously, $n$ may be much larger than 5 and in one practical application is 40. The number of rows in this particular memory is 12 so that the memory is capable of storing 12 forty bit words—a total of 480 bits.

Block 16 includes driver, logic, sensing and other circuits. FIG. 2 illustrates only the drivers. It shows that each column has a driver associated with it. In practice, the driver consists of one transistor stage for driving one wire of a column and a second transistor stage for driving the second wire of each column. To indicate this a dashed line is shown passing through the center of each driver.

Figure 3:
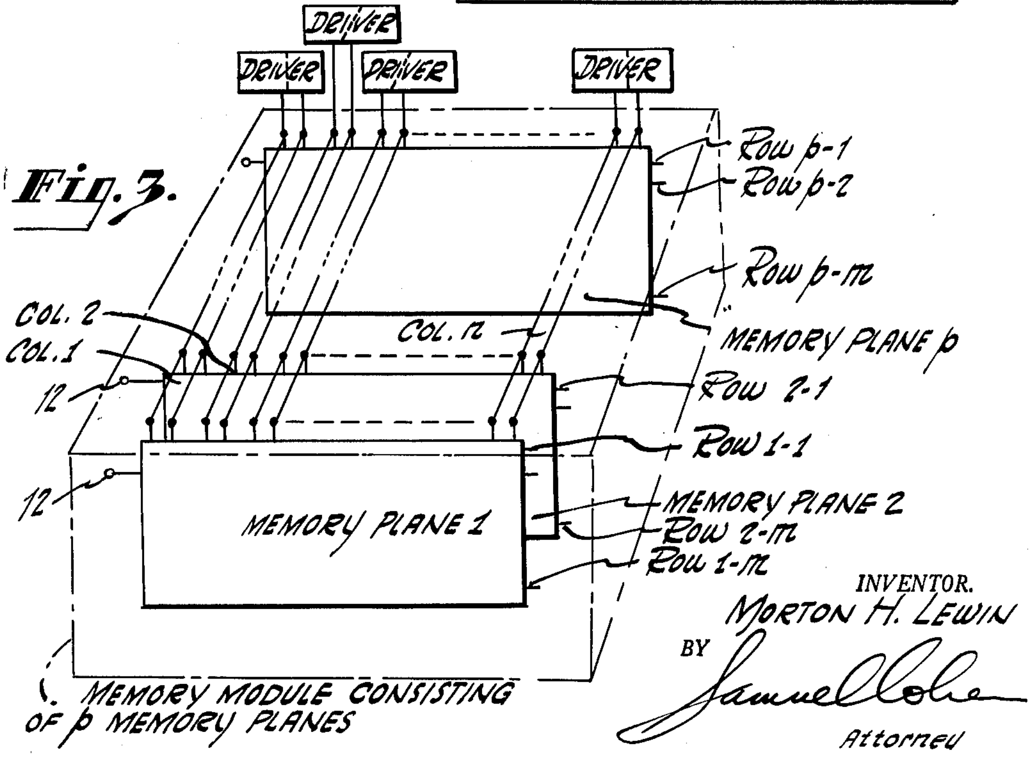
FIG. 3 is a block circuit diagram of a memory module made up of a plurality of memories such as shown in FIG. 1.

The capacity of the memory may be increased by stacking the memory planes one over another in the manner indicated schematically in FIG. 3. In this stacking arrangement, the respective columns of the memory are connected in parallel. For example, column 1 of memory plane is connected in parallel with column 1 of all the other memory planes. In a similar manner, column 2 and the other columns are connected in parallel with the corresponding columns of all memory planes. One set of driver, logic, sensing and switching circuits corresponding to those shown in block 16 of FIG. 1 is adequate for the entire memory module of FIG. 3. To illustrate this, a driver is shown connected to each group of parallel connected columns.

The limit on the size of a module depends upon the quality of the diodes employed in each memory plane, the power available at the drivers and the sensitivity of the sense amplifiers. Each diode in a memory should act like a perfect switch, that is, it should present a short circuit (no resistance) when it conducts and an open circuit when it does not conduct. However, in practice, each diode does conduct slightly even in its open circuit condition. Therefore, as the number of memory planes increase, the amount of current conducted by the diodes which should be acting like open circuits, increases. This draws part of the power available at the drivers so that the remaining current available for a conducting diode soon approaches the threshold level of the sensing circuits. In other words, a point is soon reached at which the sensing circuits cannot distinguish between the maximum current conducted by a "non-conducting" diode and the minimum current conducted by a "conducting" diode.

It is clear from the above that, in practice, there is an upper limit on the number of memory planes which can be stacked in the manner shown in FIG. 3 to provide a memory module. The limit may be upwards of 100 or more planes, the exact number depending to a large extent on the circuit elements employed and the other factors discussed above.

Figure 4:
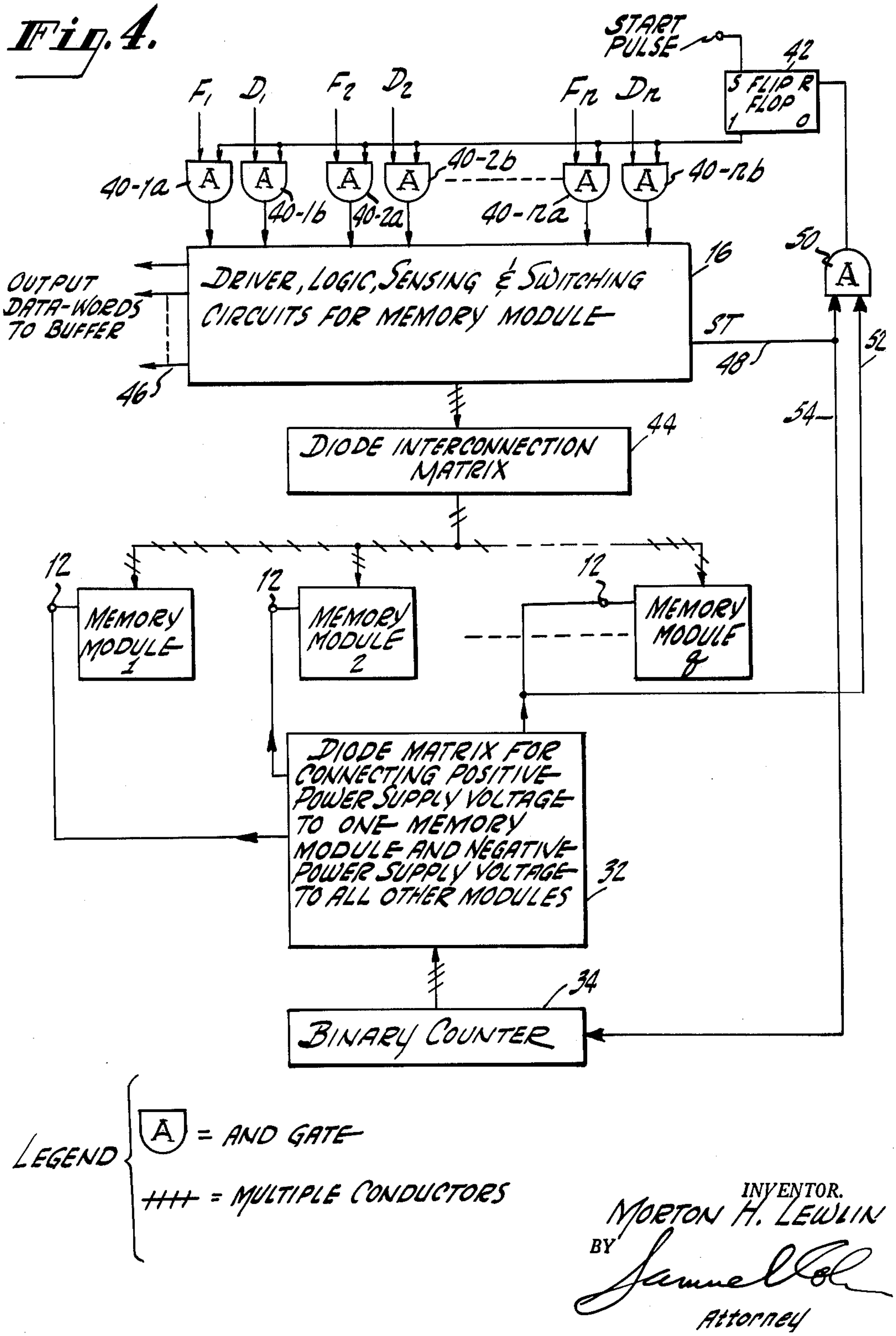
FIG. 4 is a block circuit diagram of a memory system according to the present invention.

According to the present invention, the memory capacity may be increased even further by employing a number of memory modules. Such a system is shown in FIG. 4. The driver, logic, sensing and switching circuits are shown by block 16. There are the same number of such circuits for $q$ modules as required for one memory plane of one module. The group of circuits 16 is connected through a diode interconnection matrix 44 to the $q$ memory modules. A diode matrix 32 connects a positive power supply voltage to one of the memory modules and a negative power supply voltage to all of the remaining memory modules. The memory module receiving a positive power supply is placed in operative condition by this positive voltage and all other memory modules are essentially inactivated (all diodes reverse-biased) by the negative voltage applied to these other modules. The diode matrix is controlled by a binary counter 34. The latter, in turn, is controlled by an ST signal produced by module 16.

In the memory system of the copending application, the F and D tag bits are applied directly to the set of circuits represented by block 16. In the system illustrated in FIG. 4, they are instead applied through "and" gates 40–1*a*, 40–1*b* through 40–*na*, 40–*nb*. These "and" gates are initially inactivated by the signal produced by flip-flop 42 which is in its reset condition.

To start the interrogation, the start pulse is applied to the set terminal of flip-flop 42. The one output of the flip-flop now enables the "and" gates 40 and the F and D bits of the tag word are applied through the "and" gate to the circuits 16. The diode interconnection matrix 44, which is discussed in more detail later, essentially isolates the circuits 16 from all except the selected memory module.

It may be assumed for the present that the memory module 1 is the selected one, that is, it has a positive power supply voltage applied to its terminal 12. All other memory modules have negative power supply voltages applied to their terminal 12. Now the circuits 16 retrieve from the memory module 1 all words corresponding to the tag word. These words are applied via leads 46 to a buffer storage system (not shown). When the interrogation is completed, as is discussed in detail in the copending application, a signal ST appears at output lead 48. This signal cannot pass through "and" gate 50 as the latter is inactivated by a negative voltage (corresponding to the binary bit "zero") appearing on lead 52. The ST signal, however, is applied to the binary counter 34 and advances the binary counter by one. The new count in the binary counter causes the diode matrix 42 to select another memory module to receive the positive power supply voltage. For example, memory module 2 may now have a positive voltage applied and all other memory modules a negative voltage.

The sequence of steps discussed above continues until all the words in the memory module 2 corresponding to the tag word have been retrieved. Thereafter, the ST signal again advances the binary counter to the "address" of the next memory module. The process continues until the address of the last memory module $q$ is reached. After all words have been retrieved from memory module $q$, the ST signal appears again on lead 48. However, now a positive voltage indicative of the binary bit "one" is available at lead 52 so that the ST signal passes through "and" gate 50 and resets flip-flop 42. This inactivates all "and" gates 40. The ST signal is also applied to the binary counter 34 via lead 54 and resets the binary counter to its initial condition. This assumes that the binary counter 34 has $r$ stages where $2^r=q$.

In the interrogation routine of the copending application, the time required to retrieve N words from the memory is proportional to $2N-1$. The same routine is applied to the system of the present invention. If there are $r$ words in the first module and $s$ words in the second modules and . . . $t$ words in the $q$'th module, the time required to retrieve the words from all $q$ modules is $2r-1+2s-1+ \ldots 2t-1$. As $r+x+ \ldots +t=N$, the total time required to retrieve the words from all memory modules is $2N-q$. Actually, $2N-q$ is a smaller number than $2N-1$ and it would, therefore, appear that it requires less time to retrieve the words from a memory made up of $q$ modules than it does to retrieve the same number of words from a single memory module having the capacity of the $q$ memory modules. However, in the memory of the present invention, there is some time $\Delta t$ required to switch from module to module. This time added to the time $2N-q$ gives $2N-q+q\Delta t$, a number which may be close in value to $2N-1$.

N in the equations above is normally much, much larger than 1 or $q$. Therefore, in practice, the interrogation time for the memory of the present invention is not greatly different from that of a memory in which all information is stored in one module. It is, therefore, possible, by employing the technique of the present invention, to very, very greatly increase the memory size over the upper practical limit of a single module such as shown in FIG. 3 without substantially affecting the time required to retrieve the information from the memory.

Figure 5:
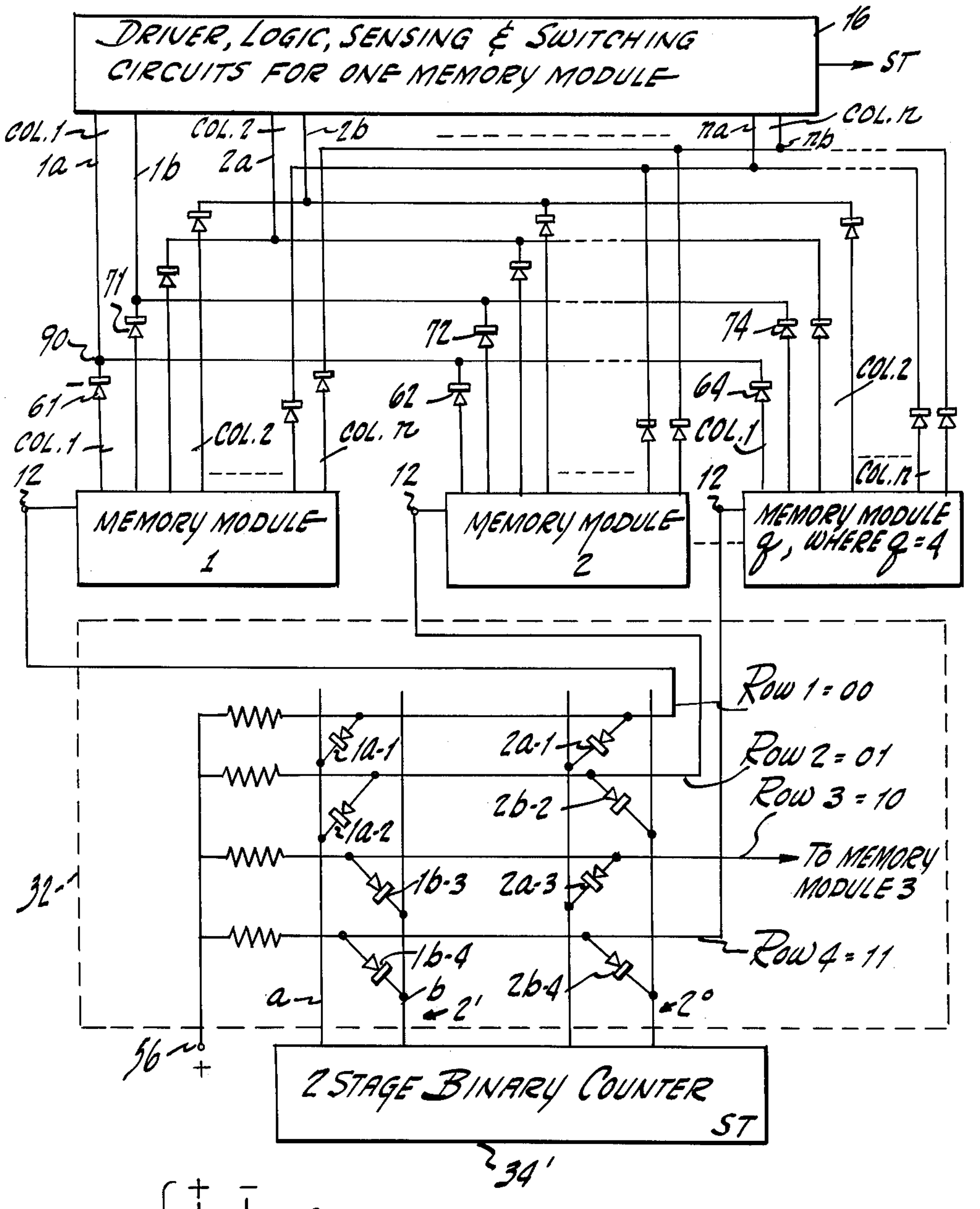
FIG. 5 is a block and schematic circuit diagram of portions of the memory system of FIG. 4.
Figure 5:
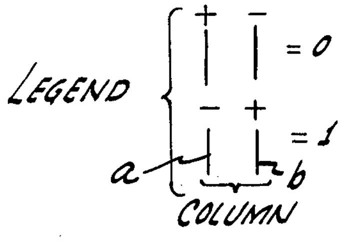

A schematic circuit diagram of a diode interconnection matrix 44 and the diode switching matrix 32 appears in FIG. 5. The diode matrix 32 is quite similar to the one of FIG. 1. However, the diodes employed should be of a considerably higher current carrying capacity. For purposes of illustration, the matrix 32 is shown to have two columns and two rows and $q$ the number of memory modules, is assumed to be 4. Row 1 of the memory stores the word 0,0; row 2, 0,1; row 3, 1,0 and row 4, 1,1. These are the respective addresses of memory modules 1, 2, 3 (now shown), and 4.

In operation, it may be assumed that the two stage binary counter 34′ initially stores the count 0,0. As indicated by the legend at the lower left of FIG. 5, 0 in a column corresponds to a positive voltage on the *a* lead of the column and a negative voltage on the *b* lead of the column. 0,0 causes the diodes 1*a*–1 and 2*a*–1 to be cut-off, however, the diodes 1*b*–3, 1*b*–4, 2*b*–4, and 2*b*–2 are rendered conductive. As diodes 1*a*–1 and 2*a*–1 are cut-off, the positive voltage appearing at terminal 56 is applied to the input terminal 12 of memory module 1. However, the negative voltages appearing at conductor *b* of the $2^1$ and $2^0$ columns appears on the row 2, 3 and 4 wires. These negative voltages are, therefore, applied to the power supply terminals 12 of memory modules 2, 3 and 4, inactivating these modules. Each time the ST signal arrives, the counter advances 1, and the next memory module is activated.

The matrix 44 consists of a group of diodes. For example, the column 1*a* lead from the circuits 16 is connected through dodes 61, 62 and 64 to the column 1*a* lead of each memory module. The column 1*b* lead from a set of circuits 16 is connected through diodes 71, 72 and 74 to the column 1*b* leads of each memory module. The diodes are so poled that they permit the selected memory module to apply signals to the circuits 16 but isolate the non-selected memory modules form circuit 16.

In operation, again assume that memory module 1 has a positive voltage applied to its terminal 12 and all other memory modules have a negative voltage applied to their terminal 12. During the interrogation routine, whenever a positive voltage is applied through a conducting diode to a column wire, it can pass through a diode such as 61, for example, to the sense amplifier circuits in block 16. However, in the case of the non-selected memory module, a negative voltage is applied to terminal 12. This negative voltage prevents any signals produced by the selected memory modules such as 1 from passing through a diode such as 61 into a non-selected memory module.

What is claimed is:

1. A content-addressed memory system comprising, in combination, (a) a plurality of content-addressable memory modules;
(b) circuits to which a tag word may be applied for retrieving the words in a module corresponding to a tag word;
(c) a plurality of gates connected to the circuits of sub-paragraph (b) for receiving a tag word;
(d) means coupled to said gates for applying an enabling signal thereto;
(e) means for connecting the circuits of sub-paragraph (b) to the modules, in sequence, for retrieving from each module the words therein corresponding to said tag word;
(f) means responsive to the retrieval from a module of all of the words therein corresponding to a tag word for producing an output signal; and
(g) means responsive to said output signal indicative of the retrieval from the last module of all of the words therein corresponding to said tag word for removing the enabling signal from said gates.

2. A content-addressed memory system comprising, in combination, (a) a plurality of content-addressable memory modules;
(b) a power supply for one of the modules for activating the same;
(c) means including a diode matrix for connecting said power supply solely to one of said modules; and
(d) means, including a binary counter which is coupled to said diode matrix, responsive to an output signal from said module for disconnecting said power supply from said one module and connecting it to a second module.

3. A content-addressed memory system comprising, in combination, (a) a plurality of content-addressable memory modules;
(b) a power supply for one of the modules for activating the same;
(c) means connecting said power supply solely to one of said modules;
(d) means connected to said one module for applying a tag word therto and for retrieving from that module the words stored therein corresponding to said tag word;
(e) means connected to said module for producing an output signal in response to the retrieval therefrom of all of the words stored therein corresponding to said tag word; and
(f) means responsive to an output signal for disconnecting said power supply from said one module and connecting it to a second module.

4. A content-addressed memory system comprising, in combination, (a) a plurality of content-addressable memory modules;
(b) a power supply connected to one of the modules for activating the same;
(c) a system for retrieving from a memory module the words therein corresponding to a tag word;
(d) means for connecting the system of sub-paragraph (c) to one of said modules and disconnecting it from all other modules; and
(e) means responsive to the retrieval from said one module of all words therein corresponding to said tag word for disconnecting said power supply from said one module and connecting it to a second module, and disconnecting the system of sub-paragraph (c) from said one module and connecting it to said second module.

5. A content-addressed memory system comprising, in combination, (a) a plurality of content-addressable memory modules;
(b) a power supply for one of said modules for activating the same;
(c) a system for retrieving from a memory module the words therein corresponding to a tag word;
(d) a plurality of gates through which a tag word may be applied to the system of sub-paragraph (c);
(e) means for connecting the system of sub-paragraph (c) to said one module and disconnecting it from all other modules;
(f) means responsive to a start signal for enabling said gates; and
(g) means responsive to the retrieval from said one module of all words therein corresponding to said tag word for disconnecting said power supply from said one module and connecting it to a second module, and disconnecting the system of sub-paragraph (c) from said one module and connecting it to said second module.

6. A content-addressed memory system comprising, in combination, (a) a plurality of content-addressable memory modules;
(b) a power supply for one of said modules for activating the same;
(c) a system for retrieving from a memory module the words therein corresponding to a tag word;
(d) a plurality of gates through which a tag word may be applied to the system of sub-paragraph (c);
(e) means responsive to a start signal for enabling said gates;
(f) means for connecting the system of sub-paragraph (c) and said power supply to said modules, in succession; and
(g) means responsive to the retrieval from the last one of said modules of the last word therein corresponding to said tag word for removing said enabling signal from said gates.

7. A content-addressed memory system comprising, in combination, (a) a plurality of content-addressable memory modules;

(b) a power supply for one of said modules for activating the same;

(c) a system for retrieving from a memory module the words therein corresponding to a tag word;

(d) a plurality of gates through which a tag word may be applied to the system of sub-paragraph (c);

(e) means responsive to a start signal for enabling said gates;

(f) means for connecting the system of sub-paragraph (c) to one of said modules and disconnecting it from all other modules;

(g) means responsive to the retrieval from each module of all words therein corresponding to said tag word for disconnecting said power supply from that module and connecting it to a succeeding module, and also disconnecting the system of sub-paragraph (c) from that module and connecting it to said succeeding module; and (h) means responsive to the retrieval from the last one of said modules of the last word therein corresponding to said tag word for removing said enabling signal from said gates.

References Cited by the Examiner

UNITED STATES PATENTS 3,093,814 6/1963 Wagner ---------- 340—173 X

OTHER REFERENCES

Kiseda Publication: "A Magnetic Associative Memory," IBM Journal, pp. 106–121, April 1961.

IRVING L. SRAGOW, *Primary Examiner.*

T. W. FEARS, *Assistant Examiner.*